United States Patent [19]

Sakane et al.

[11] 4,301,478
[45] Nov. 17, 1981

[54] TV CAMERA WITH FOCUS DETECTING MEANS

[75] Inventors: Toshio Sakane, Yokohama; Kazuya Hosoe, Machida; Takao Kinoshita, Tokyo; Tokuichi Tsunekawa, Yokohama; Takashi Kawabata, Kamakura, all of Japan

[73] Assignee: Canon Kabushiki Kaisha, Tokyo, Japan

[21] Appl. No.: 97,854

[22] Filed: Nov. 27, 1979

[30] Foreign Application Priority Data

Nov. 30, 1978 [JP] Japan ............................... 53-148091

[51] Int. Cl.³ .............................................. H04N 3/26
[52] U.S. Cl. ..................................... 358/227; 358/225
[58] Field of Search ...................... 358/227, 41, 43, 50, 358/209, 212, 213, 225, 285

[56] References Cited

U.S. PATENT DOCUMENTS

| | | | |
|---|---|---|---|
| 3,708,619 | 1/1973 | Martin | 358/227 |
| 3,883,689 | 5/1975 | Mansour | 358/227 |
| 3,967,056 | 6/1976 | Yata | 358/227 |

Primary Examiner—Marc E. Bookbinder
Assistant Examiner—Michael A. Masinick
Attorney, Agent, or Firm—Toren, McGeady & Stanger

[57] ABSTRACT

In the disclosed TV camera, a focus detecting device detects the focus of the image optical system by evaluating the image of the object whose image is to be picked up, on the basis of the picture image signal obtained at a predetermined position in the image pick up surface of the image pick up device. At least a part of the image to be evaluated is formed at a position within the scanning area of the image pick up device but outside of the effective image pick up area for TV signals. The image is evaluated on the basis of the picture image signal obtained at this position to detect the focus.

10 Claims, 42 Drawing Figures

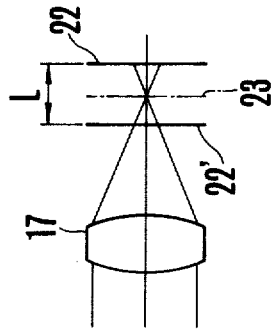
FIG. 4a (IN-FOCUS STATE)
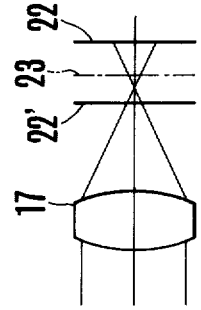
FIG. 4b (BEFORE-FOCUS STATE)
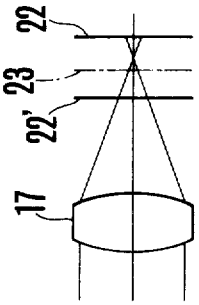
FIG. 4c (BEHIND-FOCUS STATE)
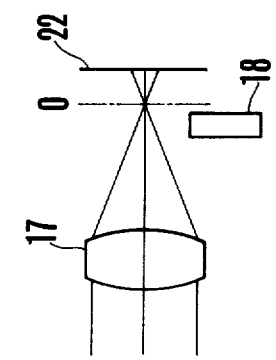
FIG. 3a
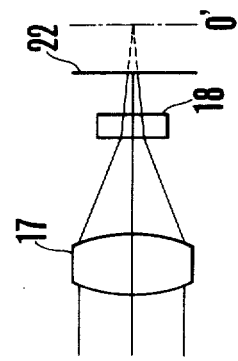
FIG. 3b
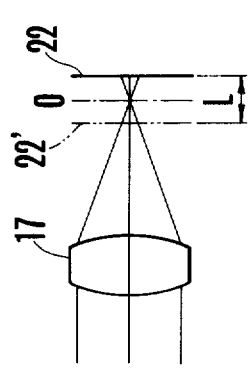
FIG. 3c

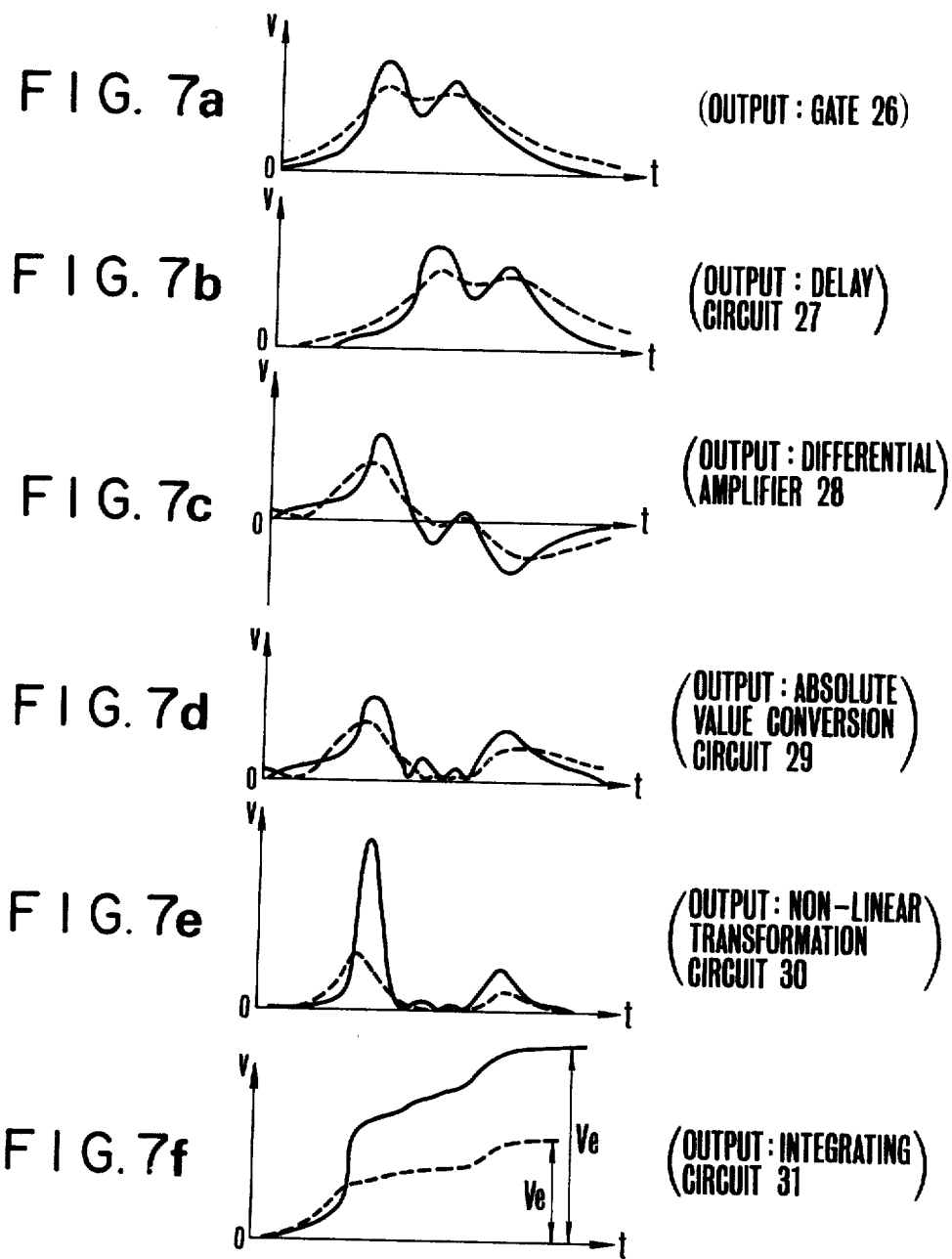

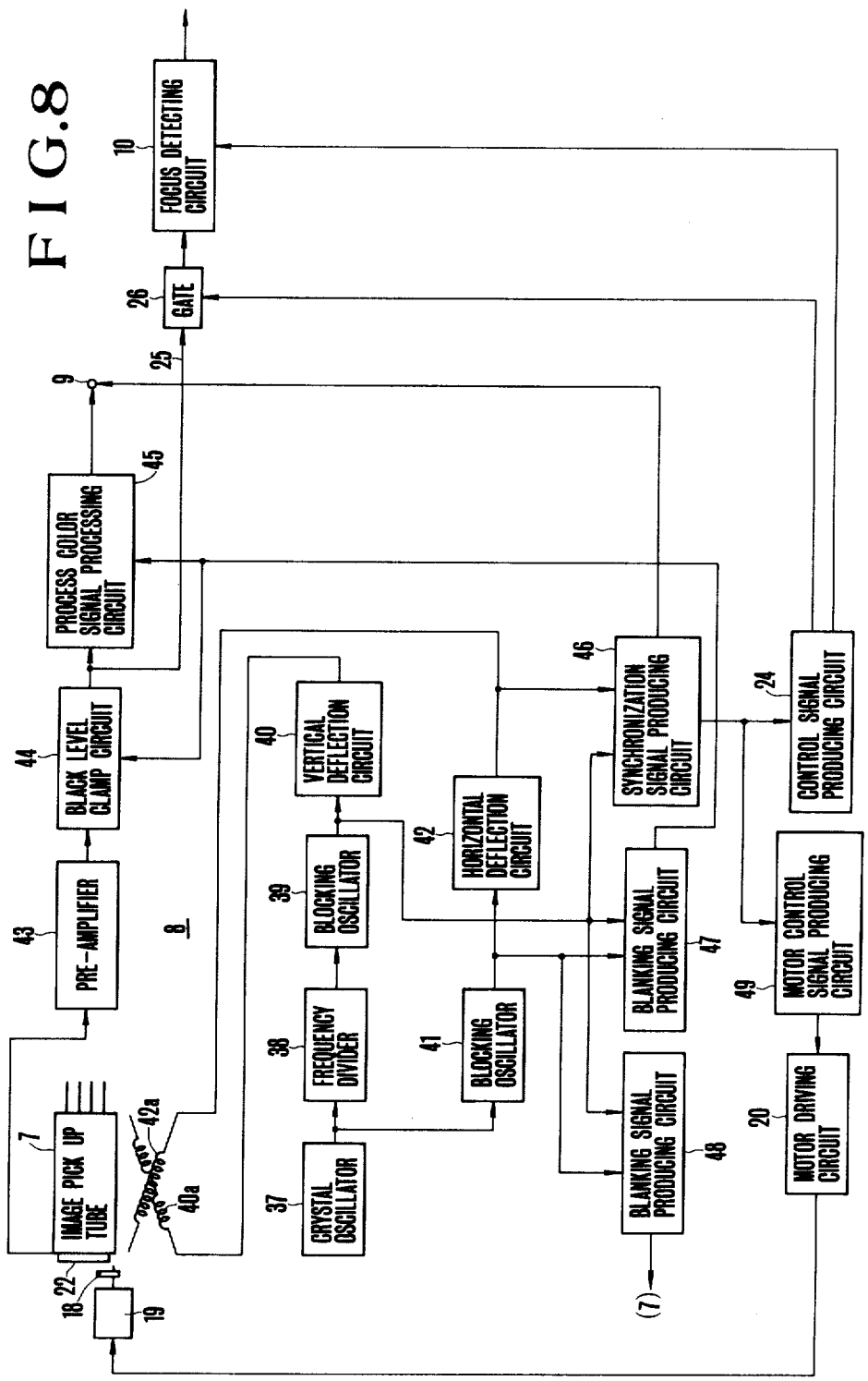

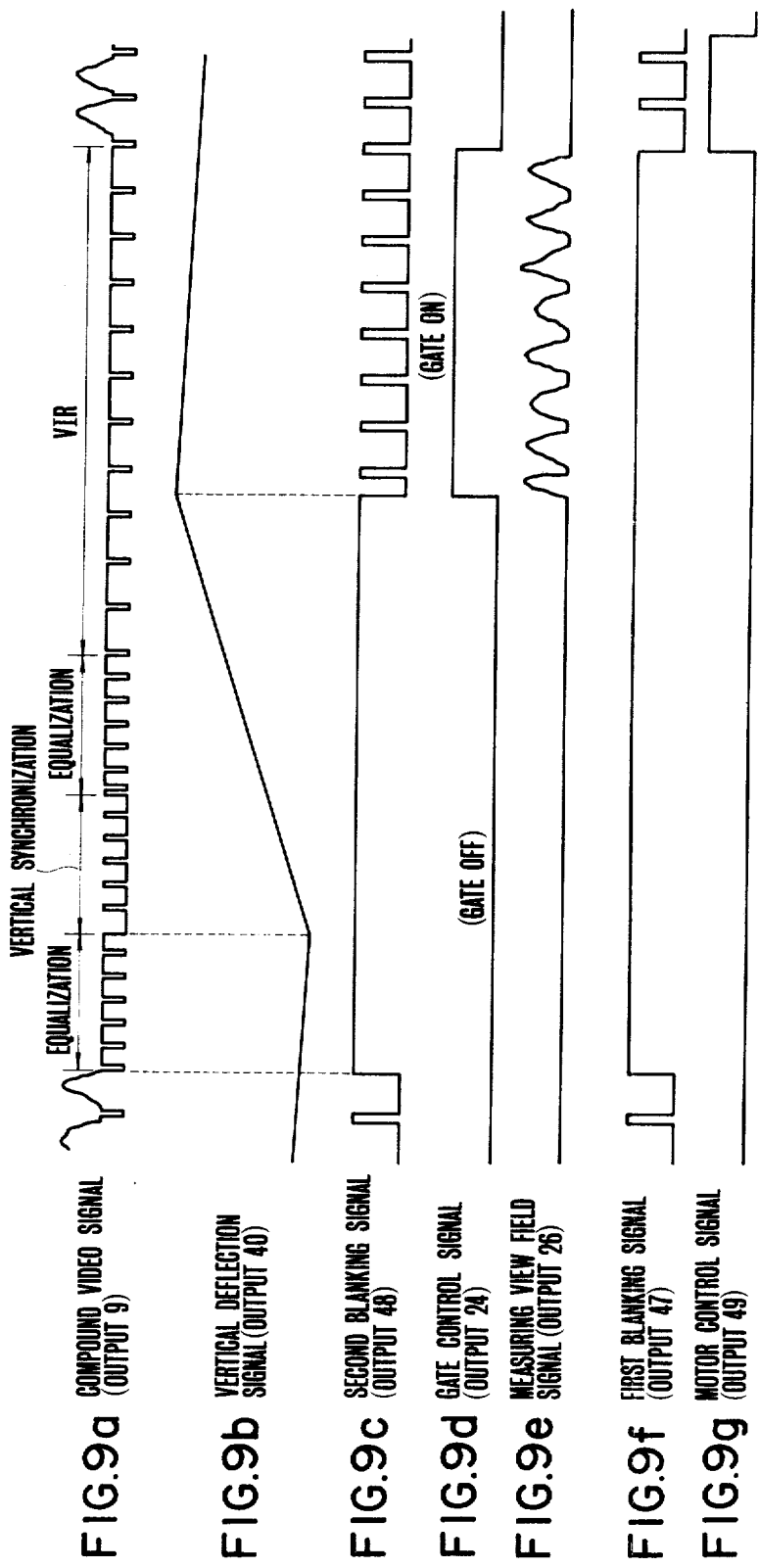

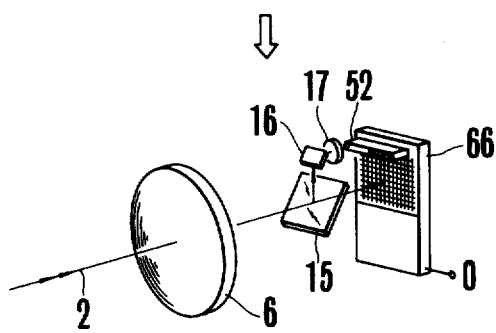
F I G. 10a
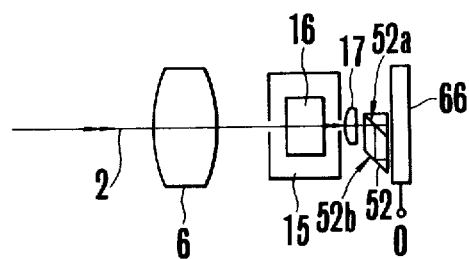
F I G. 10b
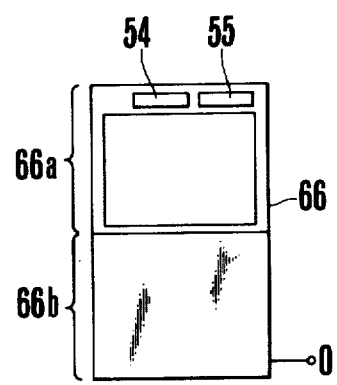
F I G. 10c

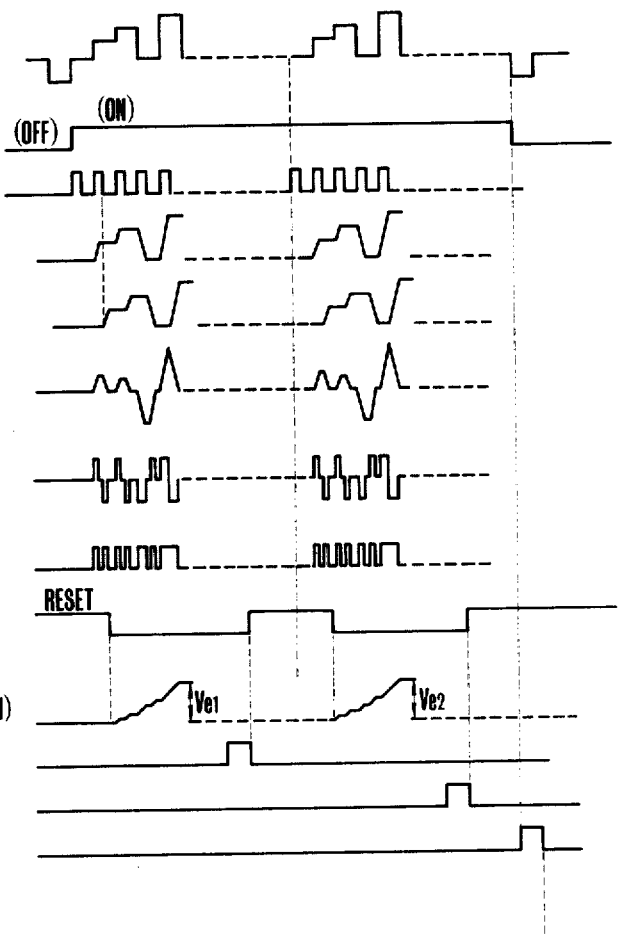

TV CAMERA WITH FOCUS DETECTING MEANS

BACKGROUND OF THE INVENTION

1. Field of the Invention

The present invention relates to a TV camera, particularly a TV camera with focus detecting means.

2. Description of the Prior Art

Most of the TV camera focus detecting or automatic focus adjusting devices that have been proposed operate by utilizing the time serial image signals generated in the image pick up device and utilizing the picture image signal for one portion corresponding to the measuring view field so as to evaluate the focus of image formed. However, the evaluation of the picture image signal for one portion is not sufficient to determine whether the image is focused in front of the sensing surface or behind it, i.e., whether it is the near-focus state or the far-focus state although the in-focus state can be detected. If the televised object is in motion, the vibration of the camera or the variation of the object brightness during the measurement causes the evaluation signal (hereinafter called focus signal) to fluctuate in such a manner that practical focus adjustment is almost impossible.

In order to avoid this type of inconvenience, a so-called focus modulation method is used. This method involves arranging a vibrating optical device in the optical path. In view of the construction of an actual camera the above means inevitably have an undesired influence on the effective picture plane.

SUMMARY OF THE INVENTION

A principal purpose of the present invention is, taking the above mentioned inconvenience into consideration, to offer a novel TV camera with a focus detecting arrangement that always detects the focus of the image forming optical system with high accuracy and stability by making use of the image pick up signal from the image pick up device for TV signal without producing any undesired effect on the TV signal image pick up area.

The present invention is characterized in that at least a part of the image of the object to be focused is formed at a position in the scanning area of the image pick up device of TV camera but outside of the effective image pick up area for TV signal. Hence, the image of the above object is evaluated on the basis of the picture image signal obtained from said position.

Another purpose of the present invention is to offer a more useful TV camera with focus detecting means arrangement that detects defects not only when the image of the object is in focus or out of focus but also the direction of the out-of-focus condition, namely, it detects the rear-focus state and the far-focus state can be detected with very high accuracy.

For this purpose, in accordance with the present invention the above mentioned position in the scanning area of the image pick up device has two images of the same object formed at an equal distance before and the behind the focal plane by way of time division or space division, while the sharpness of the respective images vary in accordance with the adjustment of the image forming optical system, and the sharpness of the two images is detected by the respective picture image signals while by comparing them with each other not only to determine the in-focus conditions but also the direction of the out-of-focus condition.

Further another purpose of the present invention is to increase the accuracy of the detection of the image sharpness which is particularly important for the focus detection.

For this purpose, in accordance with the present invention, when the image sharpness detecting system detects the image sharpness, the variation of the brightness of the image at each of two positions close to each other is detected on the basis of the picture image signal obtained from the above mentioned position in the scanning area of the image pick up device, while the signal is weighted corresponding to the level of the brightness variation (non-linear conversion) and then the signals added one by one or integrated, so as to obtain an added or integrated signal which is used as an index of the sharpness of the image.

Thus, in accordance with the present invention, the picture image signal for evaluating the focus is obtained at the position within the scanning area but outside of the effective image pick up area for TV signal of the image pick up device (namely, the image pick up area for obtaining the TV signal) so that the focus can be detected with very high accuracy without imparting any undesired influence to the TV image pick up surface.

Connected with the above, in accordance with the present invention it is possible to scan the two images at the same distance behind and before the focal plane (namely, the predetermined focal plane of the image forming optical system) by making use of the TV image pick up device so that it is possible to evaluate the image focus by comparing the sharpness of the two images at the same distances before and behind the focal plane and in consequence, it becomes possible to carry out the stabilized focus detection without causing any variation of the focus signal in spite of the object movement, the camera movement and the object brightness variation.

The image sharpness detecting system proposed in the present invention, makes it possible always to carry out a stabilized image sharpness detection operation, namely focus detection regardless of various conditions of the object, for example, a wide range of the change of the size, the contrast or the brightness.

Other purposes and features of the present invention will become apparent from the following description when read with the accompanying drawings of various embodiment.

BRIEF DESCRIPTION OF THE DRAWINGS

Below the present invention will be explained in detail in accordance with the embodiments shown in the accompanying drawings.

FIG. 3, a–c, shows the optical path length changing member for explaining the operation.

FIG. 4, a–c, shows the relation between optical path length difference between the two images and the position of the equivalent image pick up plane.

FIG. 7, a-f, shows the wave forms of the output signals from the circuit blocks of the circuit in FIG. 6.

FIG. 8 shows the block diagram of the TV signal generating circuit.

FIG. 9, a-g, shows the wave forms of the output signals from the circuit blocks of the circuit in FIG. 8.

FIG. 10, a-c, shows the optical arrangement of the image pick up system of another embodiment in accordance with the present invention.

FIG. 12, a-m, shows the wave forms of the output signals from the circuit blocks of the circuit in FIG. 11.

DETAILED DESCRIPTION OF THE PREFERRED EMBODIMENTS

Figure 1:
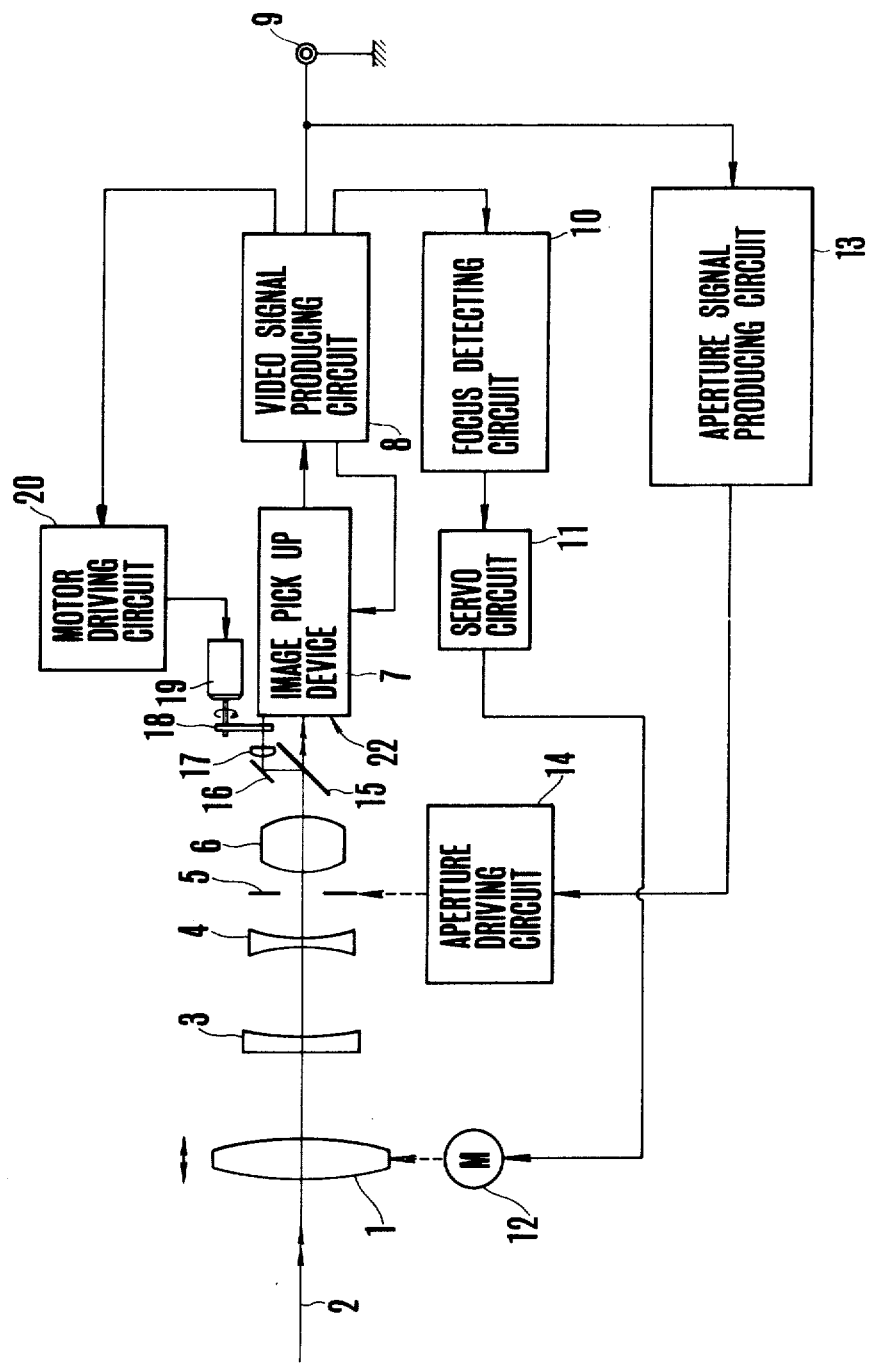
FIG. 1 shows the basic construction of an embodiment in accordance with the present invention.

FIG. 1 shows an embodiment of the present invention. In this drawing, an image forming system includes lens located on an image forming optical axis 2, a variator lens 3, a compensator lens 4, an iris 5 and a relay lens 6. An image pick up device 7 (image pick up element such as image pick up tube or (CCD) defines an image pick up plane 22 located to correspond to the predetermined focal plane of the relay lens 6. An image scanning signal of the object image formed on the image pick up plane 22 of the image pick up device 7 is generated as an ordinary video signal at the output terminal 9 by means of a video signal generating circuit 8. In order to evaluate the image formed, the image signal in a predetermined range (hereinafter simply called measuring view field) in the image pick up plane is separated and supplied to a focus detecting circuit 10. The image pick up device 7 is controlled by a control signal from the video signal generating circuit 8.

The output of the focus detecting circuit 10 is delivered to a conventional servo circuit 11 so as to control the motor 12 for advancing and withdrawing the focusing lens 1. The output of the video signal generating circuit 8 is delivered to an iris control signal generating circuit (aperture signal producing circuit) 13 and processed conventionally, for example, the output is converted into the integrated value of the image signal of one picture frame, so as to control the iris 5 through the iris drive circuit 14. A beam splitter 15 with, for example, a 30-50% reflecting index is arranged angularly between the relay lens 6 and the image pick up plane 22 of the image pick up device 7.

A reflecting mirror 16 again reflects the light beam deflected perpendicularly to the optical axis 2 by the beam splitter 15 toward the image pick up plane 22 of the image pick up device 7. The light from the mirror 16 passes through an image reforming lens 17 which is arranged to reform the image formed by means of the relay lens 6 just before the measuring view field in the image pick up plane 22 of the image pick up device 7. An optical path length changing member 18 is composed of a transparent glass plate or transparent plastic such as acrylic resin. The member 18 is rotated along the direction of the arrow by a motor 19, for example, and moved into the optical path during the first half of each rotation and out of the optical path during the second half of each rotation. The motor 19 is controlled by means of the motor driving signal generated in the video signal generating circuit 8 through the motor driving circuit 20, as explained later. With the above mentioned construction, the same image formed in the central part of the image pick up plane 22 of the image pick up device 7 is formed in the measuring view field. This makes it possible to estimate the focus of the image formed and hence, enables a user to bring the object in focus reliably by positioning the object to be focused at the center of the plane.

Figure 2A:
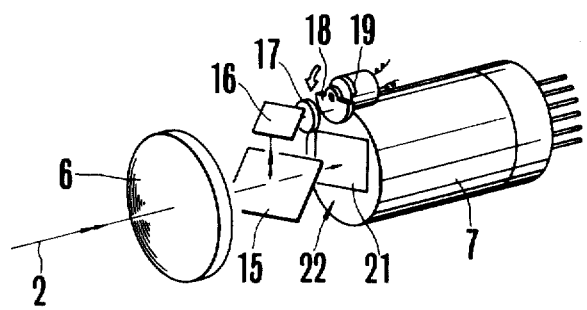
FIG. 2, including a–b, shows a part of the optical arrangement of the image pick up element of the TV camera in FIG. 1 in a detailed perspective view.
Figure 2B:
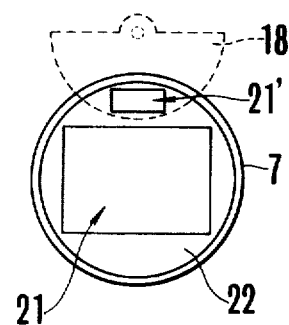

FIG. 2 shows the arrangement of the relay lens 6, the image pick up device 7 and the image evaluation system. Here, rectangular field 21 in the image pick up plane 22 of the image pick up device 7 receives for the TV signal (namely, it is the image pick up field for obtaining an effective TV signal—the main image pick up area), while the measuring view field 21' is arranged immediately above the main area to form a subsidiary area as shown in FIG. 2(b). Further, as mentioned, the measuring view field 21' which is the subsidiary area is arranged in the scanning range in the image pick up plane 22 of the image pick up device 7.

FIGS. 3(a) to 3(c) illustrate the operation of the optical path length changing member 18. In FIG. 3(a), an object not shown in the drawing is formed on the image forming plane O by means of the image reforming lens 17. In this case, the optical path length changing member 18 is shown out of the optical path. When the optical path length changing member 18 is moved into the optical path under the above mentioned condition, as shown in FIG. 3(b), the member 18 translates the image forming plane O to O'. The distance between O and O' is equal to $t(1 - 1/n)$, wherein n is the refractive index of the optical path length changing member, while t is the thickness. As a result, the sharpness of the image formed on the image pick up plane 22 is different when the optical path length changing member 18 is in the optical path and when it is not. In other words, as shown in FIG. 3(c) when the optical path length changing member 18 moved into the optical path, the effect corresponds to moving the image pick up plane 22 of the image pick up device 7 to the dot-dash line 22'.

Figure 5:
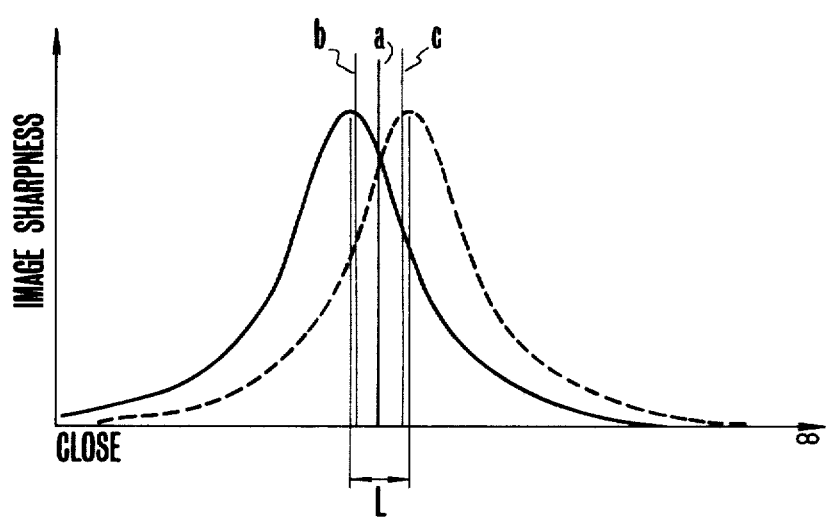
FIG. 5 shows the relation of the position of the image forming optical system and the sharpness of the image.

It is clear that $L = t(1 - 1//n)$. Hence when the image pick up plane 22 is positioned behind the predetermined focal plane 23 of the image reforming lens 17) a distance L/2, as shown in FIG. 4(a), an image of the same sharpness can be obtained on the image pick up plane 22 and at the equivalent position 22' on the optical axis of the image pick up plane 22 after the optical path changing length member has been brought into the optical path if the image is correctly formed on the focal plane 23. When the image is formed before or in front of the focal plane 23 (hereinafter called the near-focus state or condition), as shown in FIG. 4(b), the image at the equivalent position 22' is sharper than at the position 22. When on the other hand as shown in FIG. 4(c), the image is formed behind the focal plane 23 (hereinafter called far-focus state) the image at the position 22 is sharper than at the equivalent position 22'. This relation is shown on the curve of the image sharpness in FIG. 5, FIGS. 4(a), (b) and (c) respectively correspond to FIGS. 5(a), (b) and (c). Consequently, it can be concluded that the image is correctly formed on the focal plane if the sharpness of the image on the image pick up plane 22 when the optical path length changing member 18 is in the optical path is equal to that when the member 18 is not in the optical path. When the above sharpnesses are not equal to each other it can be determined whether the image is formed before or behind the focal plane in accordance with the relation between the sharpness. Consequently, by arranging the focal plane 23 of the image reforming lens 17 before the image pick up plane 22 by a distance L/2, detecting the sharpness of the image in the measuring view field 21' with the optical path length changing member 18 in the optical path and with the member 18 not in the optical path, and then comparing the picture image signals from the measuring view field with each other, it is possible to detect the focus of the image forming optical system.

Figure 6:
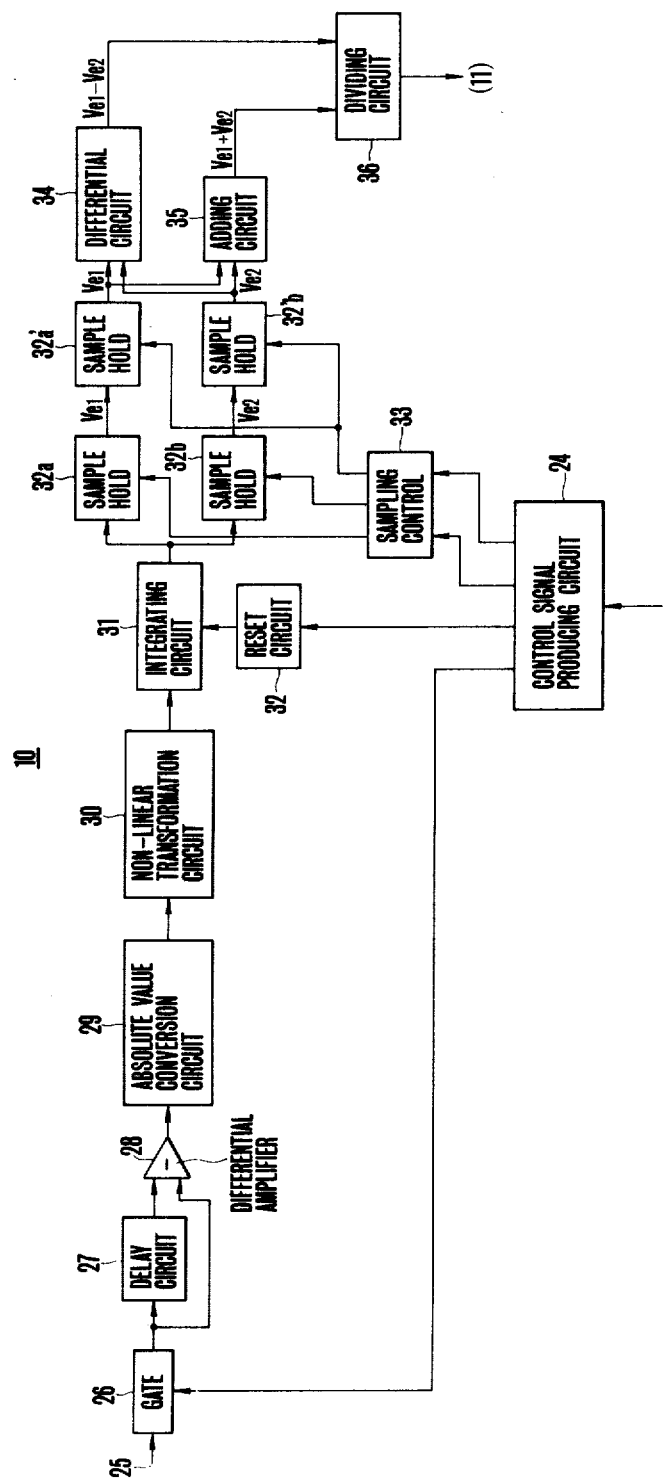
FIG. 6 shows the block diagram of the focus detecting circuit of the TV camera in FIG. 1.

An example of the focus detecting circuit 10 appears in FIG. 6. Here, a control signal generating circuit 24 in the video signal generating circuit 8 extracts the image signal from the measuring view field 21' in the image pick up plane 22 of the image pick up device 7 and controls the operation timing of the focus detecting circuit 10. An input terminal 25 receives the picture image signal from the video signal processing system. A gate 26 delivers the picture image signal to the next circuit only when the measuring view field 21' is scanned.

FIG. 7(a) shows an example of the picture image signal obtained through the gate 26. Here, the solid line shows an example where the sharpness is comparatively high, while the dotted line shows an example in which the sharpness is comparatively low. A delay circuit 27 delays the above picture image signal a predetermined time, while a differential amplifier 28 forms a differential signal between the delayed picture image signal and the non-delayed picture image signal. FIG. 7(b) shows the delayed signal, while FIG. 7(c) shows the differential output. An absolute value conversion circuit 29 forms the absolute value signal of the differential output, a non-linear conversion circuit 30 (weighting circuit) serves for carrying out the non-linear conversion in accordance with the absolute value output level. FIG. 7(d) and FIG. 7(e) respectively illustrate the output of the absolute value conversion circuit 29 and that of the non-linear conversion circuit 30.

An integrating circuit 31 serves for integrating the output of the non-linear conversion circuit all over the measuring view field 21'. When the above measuring view field 21' has been scanned, the integrating circuit 31 is reset by means of the reset circuit 32 which receives the control signal from the above control signal generating circuit 24, every time the optical path length changing member 18 is brought into and out of the optical path, so that the new signal can be integrated. FIG. 7(f) shows the output of the integrating circuit 31. From the drawing, it can be understood that the sharper the image, the higher is the final output level Ve. In consequence, it can be said that the curve shown in FIG. 5 corresponds to the variation of Ve corresponding to the adjusted state of the image pick up system. Sample hold circuit 32a samples and holds the voltage Ve (=$Ve_1$) when the optical path length changing member 18 is in the optical path and that for sample holding Ve (=$Ve_2$) when the member 18 is not in the optical path. The circuits 32a and 32b are controlled by means of the sampling control circuit 33 operated by means of a control signal from the control signal generating circuit 24. Specifically, the sample hold circuit 32a is so controled as to sample the final integrated output $Ve_1$ of the integrating circuit 31 when the optical path length changing member 18 is in the optical path and hold the output $Ve_1$ until the member 18 is again brought into the optical path for the next time, while the sample hold circuit 32b is controlled to sample the final integrated output $Ve_2$ of the integrating circuit 31 when the optical path length changing member 18 is not in the optical path and hold the output $Ve_2$ until the member 18 is again brought out of the optical path for the next time. Respective sample hold circuits 32'a and 32'b serve for sample holding the output $Ve_1$ of the sample hold circuit 32a and for sample holding the output $Ve_2$ of the sample hold circuit 32b. The circuits are controlled by the above sampling control circuit 33 so as to sample the outputs $Ve_1$ and $Ve_2$ of the sample hold circuits 32a and 32b at the end of one cycle and hold the outputs $Ve_1$ and $Ve_2$ till the end of the next cycle, whereby one cycle means the operation from the entrance of the optical path length changing member 18 into the optical path till the withdrawal of the member 18 out of the optical path.

Differential circuit 34 forms the difference between the outputs $Ve_1$ and $Ve_2$ of the sample hold circuits 32'a and 32'b and adding circuit 35 forms the sum of $Ve_1$ and $Ve_2$. A dividing circuit 36 forms the ratio signal of the sum signal to the difference signal, so that the output of the dividing circuit 36 represents $(Ve_1-Ve_2)/(Ve_1+Ve_2)$. When $Ve_1=Ve_2$, the signal is 0. When $Ve_1 \neq Ve_2$, the sign of the signal is positive or negative whether $Ve_1 < Ve_2$ or $Ve_1 > Ve_2$. Namely, as is understood from the explanation made in accordance with FIG. 4, in the in-focus state (FIG. 4(a)) the signal is 0, because $Ve_1=Ve_2$. In the near-focus state FIG. 4(b)) the sign of the signal is positive because $Ve_1 > Ve_2$, while in the far-focus state (FIG. 4(c)) the sign of the signal is negative because $Ve_1 < Ve_2$. Consequently, the output of the dividing circuit 36 is the focus signal that serves as output of the focus detecting circuit 10. This is focus signal is to be delivered to the servo-circuit 11 so as to automatically adjust the focus of the image forming optics by means of the motor 12.

Because hereby the ratio of $(Ve_1-Ve_2)$ to $(Ve_1+Ve_2)$ is used as the focus signal, a stable focus signal can be obtained substantially free from the fluctuation of the brightness of the image. This is quite advantageous. In this case the rotational speed of the optical path length changing member 18 is 1,800 r.p.m. while for example 60 scans per second are made on the image pick up plane 22 of the image pick up device 7. Hence, the motor drive circuit 20 is controlled by means of the control signal from the video signal generating circuit 8 in such a manner that the timing of the entrance and the withdrawal of the optical path length changing member 18 into and out of the optical path is synchronized with the scanning of the image pick up plane 22 in the image pick up device 7. Consequently, in the present case 30 focus signals are obtained from the focus detecting circuit 10 per second.

Details of the video signal generating circuit 8 appear in FIG. 8.

In FIG. 8, the circuit 8 includes a crystal oscillator 38 for generating standard clock pulses, a divider 38 and a vertical blocking oscillator 39 whose output drives a vertical deflection circuit 40 to generate a vertical deflection signal for driving the vertical deflection coil 40a of the image pick up device 7 (hereby the image pick up tube). The output of the crystal oscillator 37 is also delivered to a horizontal blocking oscillator 41, whose output drives a horizontal deflection circuit 42 to generate a horizontal deflection signal that drives the horizontal deflection coil 42a of the image pick up device 7. The picture image signal is taken from the image pick up device 7 as time serial signal, amplified with a preamplifier 43 and delivered from the terminal 9 as a compound video signal through a block level clamp circuit 44 and the process color signal processing circuit 45.

FIG. 9(a) shows the thus produced compound video signal while FIG. 9(b) shows the wave form of the vertical deflection signal. In FIG. 9(a) only a part of the signals which appear on the normal TV picture plane are shown at the right and the left, because the time of the equalization, the vertical synchronization and the equalization and the VIR (Vertical Interval Reference) are important for extracting the signals from the measuring view field 21'.

The output of the horizontal blocking oscillator 41 and that of the vertical blocking oscillator 39 are each delivered to a first blanking signal generating circuit 47 and to a second blanking signal generating circuit 48. The output of the first blanking signal generating circuit 47 is delivered to the black level clamp circuit 44 and a process color signal processing circuit 45, while a output of the second blanking signal generating circuit 48 is delivered to the cathode of the image pick up device 7. The details of their operation are well known so that the explanation is omitted here. FIG. 9(c) shows the waveform of the output signal of the second blanking signal generating circuit 48, while FIG. 9(f) shows the waveform of the output signal of the first blanking signal generating circuit 47.

A timing signal generating circuit produces a timing signal in accordance with the output of the vertical blocking oscillator 39 and that of the horizontal deflection circuit 42. The timing signal is added to the compound video signal as well as to the control signal generating circuit 24 and the motor control signal generating circuit 49. The control signal generating circuit 24 produces the control signal for closing the gate 26 from the time the vertical deflection signal has reached the peak value till the first blanking signal (FIG. 9(f)) terminates, in accordance with the output of the timing signal generating circuit 46, as is shown in FIG. 9(d). Thus, the picture image signal is taken out from the measuring view field 21' when the gate 26 is open. FIG. 9(e) shows this signal. The control signal generating circuit 24 further generates the reset signal for the integrating circuit 31 as is explained with respect to FIG. 6 and the sampling control signal for the sample hold circuits 32a, 32b, 32'a and 32'b.

The motor control signal generating circuit 49 produces the motor control signal in FIG. 9(g) for a predetermined time from the moment at which the gate 26 is brought into the opened state, in accordance with the output of the timing signal generating circuit 46. In this way, as mentioned, the entrance and the withdrawal of the optical path length changing member 18 into and out of the optical path is controlled to be synchronized with the scanning of the image pick up plane 22 of the image pick up device 7.

As explained above, the picture image signal of the measuring view field 21' of the TV camera is taken out, being divided in the normal image picture signal and the time serial signal, while the optical path length changing member 18 is controled.

So far the embodiment described operates by bringing the optical path length changing member 18 into and out of the optical path so that time serial two images are formed before and behind the focal plane, and the sharpness of the images are compared with each other so as to automatically adjust the focus of the image pick up system. However, the present invention is not limited to such an embodiment. It is possible to realize the same results by forming two images before and behind the focal plane spatially, as explained below.

FIG. 10 shows an example of an optical construction in accordance with which two images are formed spatially at the same time. A solid state imaging device (hereinafter called image sensor) such as a CCD is used as an image pick up device. In the drawing, the image sensor 66 is of the so-called frame transfer type, whereby the upper half portion 66a is the photosensitive part, while the lower half portion 66b is the transfer part. An output terminal O carries the time serial image picture signal. FIG. 10(b) shows the embodiment seen along the direction of the arrow in FIG. 10(a).

Behind the image reforming lens 17, light path length changing prism 52 imparts a light path difference to the light beam. The prism 52 presents a half permeable plane 52a and a totally reflecting plane 52b. Consequently, the light beam incident upon the prism 52 is split on the half permeable plane 52a, whereby the light beam which has passed through the plane 52a reaches the image pick up area 54 (FIG. 10(c)) for focus detection in the photo-sensitive portion 66a so as to be reflected on the totally reflecting plane 52b and reaches the image pick up area 55 (FIG. 10(c)) for focus detection. There is already the above mentioned light path length difference L because the light beam reflected on the half permeable plane 52a passes through a long light path before reaching the image pick up area 55. Consequently, if the image pick up plane (light sensitive plane) of the image sensor 66 is arranged a distance L/2 before the focal plane of the image to be formed with the light beam having passed through the half permeable plane 52a, the same effect as is explained in accordance with FIG. 4 can be obtained.

In the present embodiment the light sensitive portion 66a of the image sensor 66 is made larger than the ordinary effective image pick up area for TV signals by the measuring view fields 54 and 55, while the prism 52 and other parts of the optical system are arranged outside of the effective image pick up plane.

Figure 11:
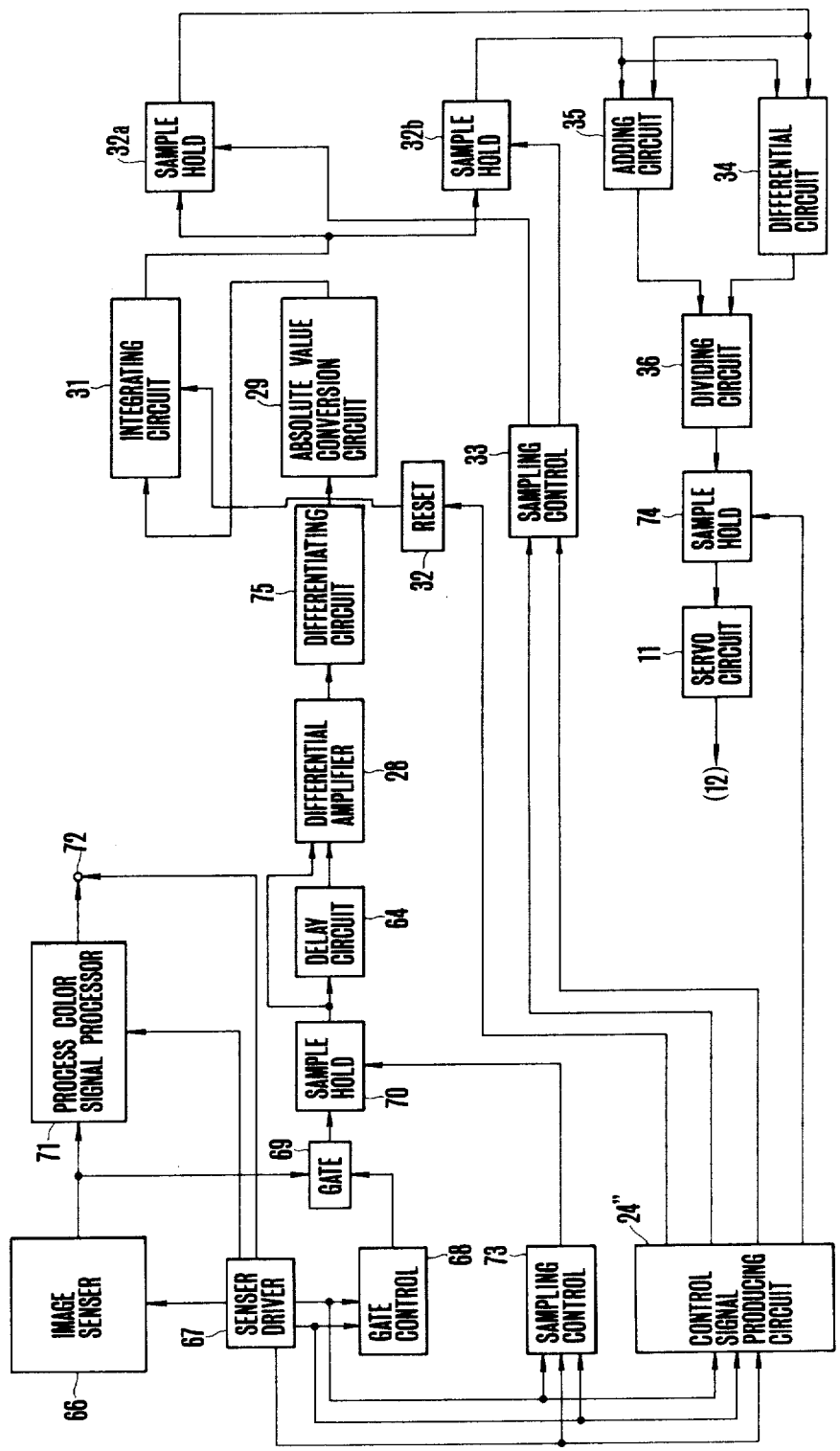
FIG. 11 shows the block diagram of the electrical circuit to be applied to the embodiment in FIG. 10.

FIG. 11 shows the electrical circuit used with the embodiment shown in FIG. 10, while FIG. 12 shows the wave forms of the output signals of the respective circuit blocks. In FIG. 11, a sensor driving circuit 67 drives the image sensor 66 which generates the video signal. 71 is the process color signal generating circuit, whereby the above signal is delivered from the terminal 72 through the circuit 71 as compound video signal. A sensor driving circuit 67 produces a vertical timing signal, a horizontal timing signal and clock pulses. The horizontal and the vertical timing signal are delivered to the gate control signal generating circuit 68, the sample hold control signal generating circuit 33 and the control signal generating circuit 24'', while the clock pulse is delivered to the sample hold control signal generating circuit 73 and the control signal generating circuit 24''.

The above control circuit system takes the signal of the measuring view field from the output of the image sensor through the gate 69 so that it is sample held by the sample hold circuit 70 and thereafter processed substantially in the same way as mentioned, so that the motor control signal is delivered from the dividing circuit to the servo circuit 11. However, in case of the present embodiment the output of the differential amplifier 28 which has been differentiated by means of the differentiating circuit 75 is applied to the absolute value conversion circuit 29. With such a signal process the results of the above embodiment can be realized. Further, the present embodiment is such that the output of the dividing circuit 36 is held by means of the sample hold circuit 74 for the next one cycle and then delivered to the servo circuit 11. By providing the sample hold circuit 74 the sample hold circuits 32′a and 32′b shown in FIG. 6 become unnecessary.

FIG. 12(a) shows the signal waveform of the image sensor output obtained from the measuring view field. In the case of the image pick up tube a continuous wave form is produced, while in case of the image sensor a step-shaped signal is produced. FIG. 12(b) shows that the gate 69 is in the closed state while the above measuring view field signal is being produced, and FIG. 12(c) shows the sampling pulses generated with the sample hold control signal generating circuit 73 FIG. 12(d) illustrates the output of the image sensor sample held by means of the sample hold circuit 70 and FIG. 12(e) shows the signal delayed by means of the delay circuit 64. FIG. 12(f) shows the waveform of the output of the differential amplifier 28, while FIG. 12(g) shows the wave form of the output of the differentiating circuit 75 and FIG. 12(h) is the wave form of the output of the absolute value conversion circuit 29. FIG. 12(i) shows the operation of the integrating circuit 31, while FIG. 12(j) shows the outputs Ve$_1$ and Ve$_2$ of the integrating circuit 31. FIG. 12(k) and FIG. 12(l) show the sampling signals for the sample hold circuits 32a and 32b. The voltages Ve$_1$ and Ve$_2$ are processed in the same way as in case of the embodiment of the circuit shown in FIG. 6. The sampling pulse produced with the timing shown in FIG. 12(m) is delivered to the sample hold circuit 74 so as to hold the output of the dividing circuit 36 till the next cycle.

As mentioned above, in accordance with the present invention the measuring view field signal is detected by making use of the output of the image pick up device, while by arranging the measuring view field outside of the effective image pick up area for TV signal the image forming state can be estimated without imparting any undesired influence to the TV picture plane. Further, in accordance with the present invention, by comparing the sharpness of the images of the same objects formed before and behind the focal plane by the same distance on the optical axis with each other the in-focus state, the near-focus state or the far-focus state which is essential for the automatic focus adjustment can easily be detected. Further, especially in accordance with the signal processing of the embodiment the undesired influence due to the movement of the object, the variation of the sharpness or the inferior holding can completely eliminated. This is quite convenient and advantageous.

While embodiments of the invention have been described in detail, it will be evident to those skilled in the art that the invention may be embodied otherwise without departing from its spirit and scope.

What is claimed is:

1. A television camera comprising:
   (A) an image pick-up device including an image pick-up surface with a main pick-up area and a subsidiary pick-up area;
   (B) an image forming optical system for forming an image of an object to be picked up on the main image pick-up area in the image pick-up surface of the image pick-up device;
   (C) a detecting optical system for forming at least one detection image of the object for focus detection on the subsidiary image pick-up area in the image pick-up surface of the image pick-up device but outside of the main image pick-up area; and
   (D) a circuit system for producing a signal related to focus of the image forming optical system on the basis of the image signal obtained from the subsidiary image pick-up area of the image pick-up device.

2. A television camera according to claim 1, wherein the detecting optical system is arranged to form at least a part of the object image with the image forming optical system on the subsidiary image pick up area of the image pick up device as the detection image.

3. A television camera according to claim 1 or claim 2, wherein the circuit system generates the signal related to a focusing of the image forming optical system by detecting the sharpness of the detecting image formed by the detecting optical system on the basis of the image signal obtained from the subsidary image pick up area of the image pick up device.

4. A television camera according to claim 3, wherein the circuit system includes:
   variation detecting means for receiving the image signal obtained from the subsidary image pick up area of the image pick up device and for producing a variation signal indicative of the signal;
   non-linear transformation means for non-linearly transforming the variation signal produced from the variation detecting means; and
   integrating means for integrating the non-linearly transformed signal produced from the non-linearly transformation means, an output of said integrating means being indicative of the sharpness of the detection image formed by the detection optical system.

5. A television camera according to claim 3, wherein the detecting optical system has a predetermined focal plane, and the subsidiary image pick up area of the image pick up device is arranged so as to receive the detecting image formed with the detecting optical system at a position behind the focal plane by a predetermined distance;
   said television camera further comprises:
   image shift means selectively operable for shifting the image plane in such a manner that the subsidiary image pick up area of the image pick up device receives the detecting image formed with the detecting optical system equivalently at the position before the focal plane by a predetermined distance; and
   said circuit system being arranged to produce said signal related to the focusing of the image forming optical system on the basis of a first image signal obtained from the subsidiary image pick up area of the image pick up device when the image plane has been shifted by the image plane shift means and a second image signal obtained from the subsidiary image pick up area of the image pick up device when the image plane has not been shifted.

6. A television camera according to claim 5, wherein the circuit system includes:
   variation detecting means for receiving the first and the second image signals from the subsidiary image pick-up area of the image pick-up device and for producing variation signals indicative of variations of the first and second image signals;
   non-linear transformation means for non-linearly transforming the variation signal produced from the variation detecting means;

integration means for integrating the signal non-linearly transformed by the non-linear transformation means; and comparison means for comparing a first response output of the integration means concerning the first image signal with a second response output of the integration means concerning the second image signal, an output of said comparison means being indicative of the focusing condition of the image forming optical system.

7. A television camera according to claim 3, wherein the detecting optical system has first and second predetermined focal planes with a predetermined distance therebetween along the optical axis and being arranged so as to form first and second detecting images of the object at positions corresponding to the focusing condition of the image forming optical system with reference to the first and the second focal planes;

said subsidiary image pick-up area of the image pick-up device being arranged so as to receive the first and the second detection images formed by the detecting optical system with the different image pick-up portions at a position between the first and the second focal planes; and said circuit system being arranged to produce the signal related to the focusing of the image forming optical system on the basis of a first image signal for the first detection image obtained from the subsidiary image pick-up area of the image pick-up device and a second image signal for the second detection image obtained from the subsidiary image pick-up area.

8. A television camera according to claim 7, wherein the circuit system includes:

variation detecting means for receiving the first and the second image signals from the subsidiary image pick-up area of the image pick-up device and for producing variation signals indicative of variations in the first and second image signals;

integration means for integrating the signal non-linearly transformed by the non-linear transformation means; and comparison means for comparing a first response output of the integration means concerning the first image signal with a second response output of the integration means concerning the second image signal, an output of said comparison means being indicative of the focusing condition of the image forming optical system.

9. A television camera as in claim 1, wherein said image pick-up device is capable of forming electrical signals at the image pick-up surface including the main pick-up area and the subsidiary pick-up area.

10. A television camera as in claims 1 or 9, wherein said pick-up surface is continuous, and said main pick-up area and said subsidiary pick-up area are spatially separated portions of the continuous pick-up surface.

* * * * *